No. 703,564. Patented July 1, 1902.
J. A. ELLISON.
STOP VALVE.
(Application filed Nov. 26, 1901.)

(No Model.)

WITNESSES
Stephen A. Brooks
Walter Allen

INVENTOR
James A. Ellison
by Herbert W. T. Jenner.
Attorney

THE NORRIS PETERS CO., PHOTO-LITHO., WASHINGTON, D. C.

UNITED STATES PATENT OFFICE.

JAMES A. ELLISON, OF WILMINGTON, DELAWARE.

STOP-VALVE.

SPECIFICATION forming part of Letters Patent No. 703,564, dated July 1, 1902.

Application filed November 26, 1901. Serial No. 83,722. (No model.)

*To all whom it may concern:*

Be it known that I, JAMES A. ELLISON, a citizen of the United States, residing at Wilmington, in the county of Newcastle and State of Delaware, have invented certain new and useful Improvements in Stop-Valves; and I do hereby declare the following to be a full, clear, and exact description of the invention, such as will enable others skilled in the art to which it appertains to make and use the same.

This invention relates to stop-valves provided with revoluble plugs and means for locking the plugs; and it consists in the novel construction and combination of the parts hereinafter fully described and claimed.

Figure 1:
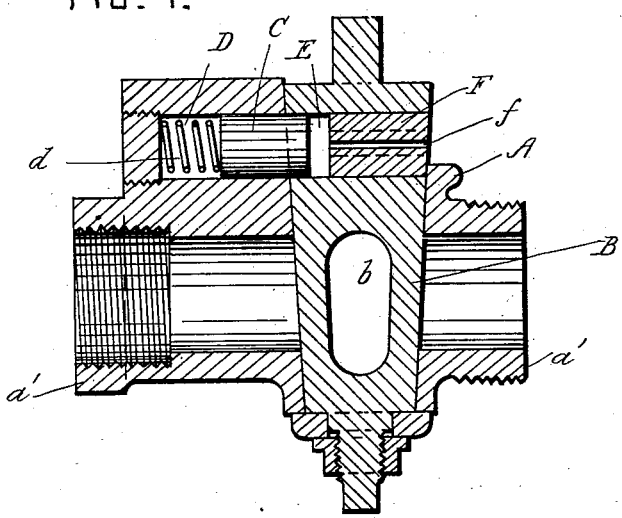
Figure 2:
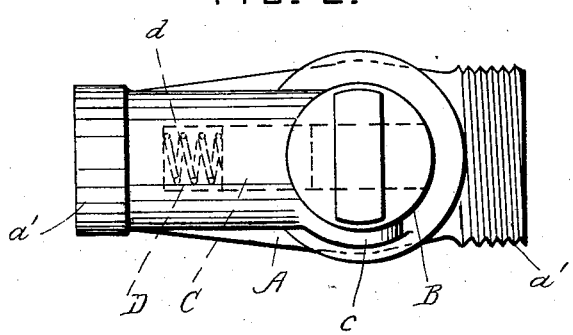
Figure 3:
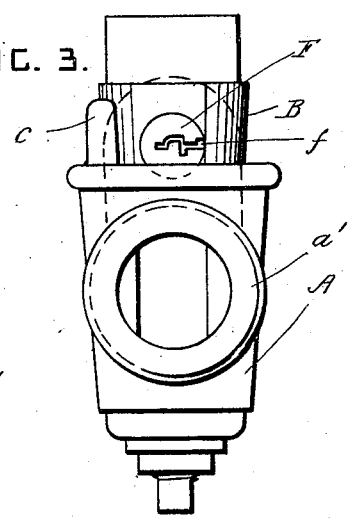

In the drawings, Figure 1 is a vertical longitudinal section through the valve. Fig. 2 is a plan view of the valve. Fig. 3 is an end view of the valve.

A is the casing of the valve, and B is the plug, which is journaled in the casing A in the usual manner. The casing is provided with pipe connections $a'$, and the plug has a passage $b$, which establishes a connection between the pipe connections when the valve is turned to the "open" position.

C is a slidable spring-actuated bolt arranged in a chamber D, which is formed integral with the casing A and arranged longitudinally above one of the pipe connections or branches $a'$. A shield $c$ is formed at one end of the chamber D for the upper portion of the plug to bear against.

E is a hole formed transversely through the upper part of the plug on a level with the chamber D, and the spring $d$ behind the bolt C presses the bolt into engagement with one end portion of the hole E whenever the plug is turned so as to place that end of the hole opposite the chamber. The hole E is arranged crosswise of the passage $b$ in the plug, so that when the plug is locked to the casing by the bolt the valve is in a "closed" position.

F is a keyhole-plug which is fitted into the opposite end portion of the hole E and provided with a keyhole $f$. This keyhole $f$ has grooves, corrugations, or wards of such approved construction as shall permit of the use only of a specially-formed key. This key is inserted into the keyhole and is used to press the bolt backward out of engagement with the hole E. The plug is partially revolved while the bolt is pressed back by the key, and the key is then withdrawn from the keyhole.

The valve can be closed as often as desired without locking it by turning the plug one-half around from the position shown in Fig. 1. This valve is specially intended as a stop-valve for gas-consumers between the gas-meter and the main pipe in the street. This valve is normally open, and the keyhole is concealed and protected by the shield $c$. When the meter is to be repaired, the valve can be closed without locking it; but when the gas-supply is to be cut off for non-payment of gas-bill the plug is turned to the position shown in Fig. 1 and can only be unlocked by the use of the proper key, which remains in the possession of the gas company.

What I claim is—

1. The combination, with a valve-casing, and a plug journaled therein and provided with a single hole formed transversely through its upper part, of a spring-actuated bolt carried by the said casing and engaging with one end portion of the said hole, and a keyhole-plug in the other end of the said hole, substantially as set forth.

2. The combination, with a valve-casing provided with a keyhole-shield at its top, and a plug journaled in the said casing and provided with a hole in its upper part, of a spring-actuated bolt carried by the said casing and engaging with one end portion of the said hole, and a keyhole-plug closing the other end of the said hole and working against the said shield and the end of the bolt, substantially as set forth.

In testimony whereof I affix my signature in presence of two witnesses.

JAMES A. ELLISON.

Witnesses:
D. J. KENNEALLY,
W. FRANK BAILEY.